United States Patent
Kurose

(10) Patent No.: US 10,871,560 B2
(45) Date of Patent: Dec. 22, 2020

(54) RADAR SATELLITE AND RADAR SATELLITE SYSTEM USING RADAR SATELLITE

(71) Applicant: KAWASAKI JUKOGYO KABUSHIKI KAISHA, Kobe (JP)

(72) Inventor: Toyotoshi Kurose, Seki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 254 days.

(21) Appl. No.: 15/527,042

(22) PCT Filed: Nov. 9, 2015

(86) PCT No.: PCT/JP2015/005584
§ 371 (c)(1),
(2) Date: May 16, 2017

(87) PCT Pub. No.: WO2016/079945
PCT Pub. Date: May 26, 2016

(65) Prior Publication Data
US 2018/0246202 A1   Aug. 30, 2018

(30) Foreign Application Priority Data
Nov. 18, 2014 (JP) .................................. 2014-233447

(51) Int. Cl.
*G01S 13/90* (2006.01)
*B64G 1/26* (2006.01)
(Continued)

(52) U.S. Cl.
CPC ............ *G01S 13/90* (2013.01); *B64G 1/1014* (2013.01); *B64G 1/222* (2013.01); *B64G 1/26* (2013.01);
(Continued)

(58) Field of Classification Search
CPC . G01S 13/90; G01S 7/28; G01S 7/003; G01S 13/89; G01S 7/03; G01S 7/02;
(Continued)

(56) References Cited

U.S. PATENT DOCUMENTS 4,163,231 A * 7/1979 Zuerndorfer ............ G01S 13/90
342/189
5,430,451 A * 7/1995 Kawanishi ................ B64G 1/22
342/354
(Continued)

FOREIGN PATENT DOCUMENTS

| JP | H11-505696 A | 5/1999 |
| JP | 2012-131458 A | 7/2012 |

(Continued)

OTHER PUBLICATIONS

May 18, 2018 Extended European Search Report issued in Patent Application No. 15861404.0.
Feb. 2, 2016 International Search Report issued in Patent Application No. PCT/JP2015/005584.

*Primary Examiner* — Frank J McGue
(74) *Attorney, Agent, or Firm* — Oliff PLC

(57) ABSTRACT

A radar satellite of the present invention comprises a radar unit including a plurality of radar panels coupled to each other in a single flat plate shape, each of the plurality of radar panels including a plurality of antennas which transmit and receive radar waves, and a solar cell; and a communication/control unit which performs communications with a spot on an earth or a spacecraft. The radar unit includes: a radar panel array which is a plate-shaped structure including the plurality of radar panels; and a deployable truss structure including a plurality of side frame members supporting the plurality of radar panels, respectively, and coupled to each other in such a manner that the side frame members are foldable and deployable.

12 Claims, 10 Drawing Sheets

(51) Int. Cl.
  *B64G 1/22*   (2006.01)
  *G01S 7/03*   (2006.01)
  *G01S 13/89*  (2006.01)
  *G01S 7/02*   (2006.01)
  *B64G 1/10*   (2006.01)
  *B64G 1/44*   (2006.01)
  *G01S 7/00*   (2006.01)
  *G01S 7/28*   (2006.01)
  *B64G 1/64*   (2006.01)

(52) U.S. Cl.
  CPC .............. *B64G 1/443* (2013.01); *G01S 7/003* (2013.01); *G01S 7/02* (2013.01); *G01S 7/03* (2013.01); *G01S 7/28* (2013.01); *G01S 13/89* (2013.01); *B64G 1/648* (2013.01); *B64G 2001/1035* (2013.01)

(58) Field of Classification Search
  CPC ...... B64G 1/443; B64G 1/1014; B64G 1/222; B64G 1/26; B64G 1/648; B64G 2001/1035
  USPC ........................................ 342/159
  See application file for complete search history.

(56) References Cited

U.S. PATENT DOCUMENTS

| | | | |
|---|---|---|---|
| 6,215,458 | B1 | 4/2001 | Aguttes et al. |
| 6,395,971 | B1* | 5/2002 | Bendel ................ H01L 31/042 |
| | | | 136/244 |
| 6,400,306 | B1 | 6/2002 | Nohara et al. |
| 7,474,249 | B1 | 1/2009 | Williams et al. |
| 7,694,486 | B2 | 4/2010 | Murphy et al. |
| 2005/0126106 | A1 | 6/2005 | Murphy et al. |
| 2007/0145195 | A1* | 6/2007 | Thomson ............... B64G 1/222 |
| | | | 244/172.6 |
| 2010/0244565 | A1* | 9/2010 | Yoshida ................ B64G 1/428 |
| | | | 307/48 |
| 2013/0263548 | A1* | 10/2013 | Merrifield ................ E04C 3/02 |
| | | | 52/646 |
| 2015/0285897 | A1* | 10/2015 | Kilty ........................ G01S 7/02 |
| | | | 342/195 |

FOREIGN PATENT DOCUMENTS

| | | |
|---|---|---|
| JP | 2014-184812 A | 10/2014 |
| JP | 2014-184813 A | 10/2014 |
| WO | 97/034801 A1 | 9/1997 |

\* cited by examiner

RADAR SATELLITE AND RADAR SATELLITE SYSTEM USING RADAR SATELLITE

TECHNICAL FIELD

The present invention relates to a radar satellite which observes an earth surface from an outer space, and a radar satellite system using the radar satellite.

BACKGROUND ART

For the purposes of weather observation, disaster response, ecological monitoring, geomorphometry, and so on, an earth surface (earth's surface) is observed by a satellite from an outer space to obtain observation information about the earth surface. As such a satellite, an optical satellite using an optical apparatus and a radar satellite using a radar apparatus are known. In the radar satellite, radar waves such as microwaves or millimeter waves are transmitted and received to and from the earth surface to obtain image information (radar images) as the observation information. Therefore, in the radar satellite, the image information can be obtained even in situations (e.g., at night and under cloudy sky) in which it is difficult to take images by the optical satellite.

In a case where the size of an antenna of the radar apparatus is equal to that of a lens of the optical apparatus, the resolution of the radar apparatus is much lower than that of the optical apparatus. Therefore, to enable the radar apparatus to realize a resolution which is almost equal to that of the optical apparatus, it is necessary to increase the size of the antenna which transmits and receives the radar waves to a great extent. However, it is difficult to construct a huge structure in the outer space. Under the circumstances, as the radar apparatus included in the radar satellite, a synthetic aperture radar (SAR) is known.

The synthetic aperture radar transmits and receives radar waves to and from the earth surface in many times while the satellite is orbiting, and synthesizes the received radar waves. This can realize the antenna which is apparently huge by the movement of the satellite, even in a case where the actual size of the antenna is small. Therefore, image information with a high resolution can be obtained. For example, Patent Literature 1 discloses a remote detection satellite or a long distance telecommunication satellite using an interferometric synthetic aperture radar (InSAR).

CITATION LIST

Patent Literature

Patent Literature 1: International Publication No. WO97/034801 brochure

SUMMARY OF INVENTION

Technical Problem

The radar satellite using the synthetic aperture radar (SAR) suffers from several problems. As described above, in the synthetic aperture radar, the radar satellite transmits and receives the radar waves to and from a wide range of the earth surface in many times to obtain the image information. For this reason, there is a time lag between the waves received in many times. To address this problem, it is necessary to execute information processing of large volumes of data by use of a high-performance computer, to synthesize the received waves. Since the synthetic aperture radar scans a wide range of the earth surface by the radar waves, the image information tends to contain a noise. In addition, the temporal (time) resolution of the image information is limited to orbiting cycles of the radar satellite, and a navigation with a high accuracy is necessary for the radar satellite to obtain a sufficiently high resolution.

In addition, in the synthetic aperture radar, a moving object cannot be detected with a resolution that is approximately equal to that in a case where a ground surface (land surface) (stationary target to be observed, such as terrain) is detected. For this reason, in the synthetic aperture radar, the moving object cannot be a target to be observed. For example, in a case where the terrain, marine context, weather, environment, or the like of a specified area of the earth surface are targets to be observed, these areas to be observed do not virtually move, and therefore, the resolution of the image information can be improved by synthesizing the waves received in many times. However, an object moving on the earth surface or moving in an airspace above the earth surface (flying over the earth surface), such as a ship or an aircraft, is moving while the synthetic aperture radar is receiving the waves in many times, and the resolution of the image information cannot be improved even if the received waves are synthesized. For this reason, in the synthetic aperture radar, it is difficult to detect the moving object with a high resolution.

As described above, the conventional radar satellite is incapable of observing the object moving on the surface (ground surface or sea surface) or the air space above the ground surface or sea surface, of a specified area to be observed. For this reason, the conventional radar satellite can observe a wide area on the earth or on the sea by comprehensive overview and for a long period of time, but cannot observe this area spatially or for a short period of time.

The present invention has been developed to solve the above-described problem, and an object of the present invention is to provide a radar satellite which can obtain more detailed information including a moving object in a case where observation information about an earth surface is obtained from an outer space, and a radar satellite system using this radar satellite.

Solution to Problem

To solve the above described problem, according to the present invention, a radar satellite comprises a radar unit including a plurality of radar panels coupled to each other in a single flat plate shape, each of the plurality of radar panels including a plurality of antennas which transmit and receive radar waves, and a solar cell; and a communication unit which performs communications with a spot on an earth or a spacecraft, wherein the radar unit includes: a radar panel array which is a plate-shaped structure including the plurality of radar panels; and a deployable truss structure including a plurality of side frame members supporting the plurality of radar panels, respectively, and coupled to each other in such a manner that the plurality of side frame members are foldable and deployable.

In accordance with this configuration, the deployable truss structure which is foldable and deployable supports the radar panel array including the plurality of radar panels, and thus the radar unit with a flat plate shape and a huge size is constructed. Therefore, at a time point when the radar satellite is launched, the radar panel array is folded. Then, in the outer space, the radar panel array is deployed. In this way, a huge conformal array radar can be constructed in the outer space. The radar satellite with this configuration can observe, for example, a relatively small object moving. Therefore, it becomes possible to provide the radar satellite which can obtain more detailed observation information including the object moving on the earth surface (ground surface and sea surface), and flying in an airspace above the earth surface, from the outer space.

By adjusting the number of the radar panels to be coupled together to construct the radar panel array, the size of the radar unit can be adjusted. Since the radar unit of the radar satellite includes the plurality of radar panels, and each of the radar panels includes the plurality of antennas, effects on the radar performance can be suppressed or avoided even if a failure occurs in a part of the antennas. Since the radar unit includes a great number of radar panels, the radar panel with a failure can be replaced with a replacement radar panel. Therefore, the radar satellite can provide a high level of redundancy.

In the radar satellite having the above-described configuration, the radar unit may include a plurality of radar panel units deployed and coupled to each other, each of the plurality of radar panel units including the plurality of radar panels and having a configuration in which one sides of the plurality of radar panels supported by the side frame members, respectively, are coupled to each other at a connection point at which the plurality of radar panels are bendable, and the plurality of radar panels are bendable and foldable at the connection point to become closer to each other, or have a configuration in which the plurality of radar panels are attached on the plurality of side frame members, respectively, included in the deployable truss structure which is deployed.

The radar satellite having the above-described configuration may further comprise a thruster unit which performs an orbit correction and a posture control for the radar unit; and a radar controller which controls an operation of the thruster unit and an operation of the radar unit.

The radar satellite having the above-described configuration may further comprise a bus unit which is a counter weight of the radar unit; and a tether wire coupling the radar unit to the bus unit.

In the radar satellite having the above-described configuration, each of the plurality of radar panels may include an electric charging unit charged with electric power generated by the solar cell, and a power supply controller which controls at least charging and discharging of the electric charging unit.

The radar satellite having the above-described configuration may further comprise a service unit which constructs the radar unit by coupling to each other a plurality of radar panel units which are deployed, and maintain the constructed radar unit.

The present invention further provides a radar satellite system comprising: the radar satellite having the above-described configuration, a ground communication apparatus which performs communications with the radar satellite; and a ground management apparatus which manages the radar satellite via the ground communication apparatus.

The radar satellite system having the above-described configuration may further comprise at least one of an aircraft, a ship, and a vehicle which are capable of performing communications with the radar satellite or the ground management apparatus.

Advantageous Effects of Invention

The present invention has an advantage that with the above-described configuration, it becomes possible to provide a radar satellite which can obtain more detailed information including a moving object in a case where observation information about an earth surface is obtained from an outer space, and a radar satellite system using this radar satellite.

DESCRIPTION OF EMBODIMENTS

Hereinafter, preferred embodiments of the present invention will be described with reference to the drawings. Throughout the drawings, the same or corresponding constituents are designated by the same reference symbols and will not be described repeatedly.

Embodiment 1

Firstly, an example of the basic configuration of a radar satellite according to the present invention will be specifically described with reference to FIGS. 1 to 3.

[Basic Configuration of Radar Satellite]

Figure 1:
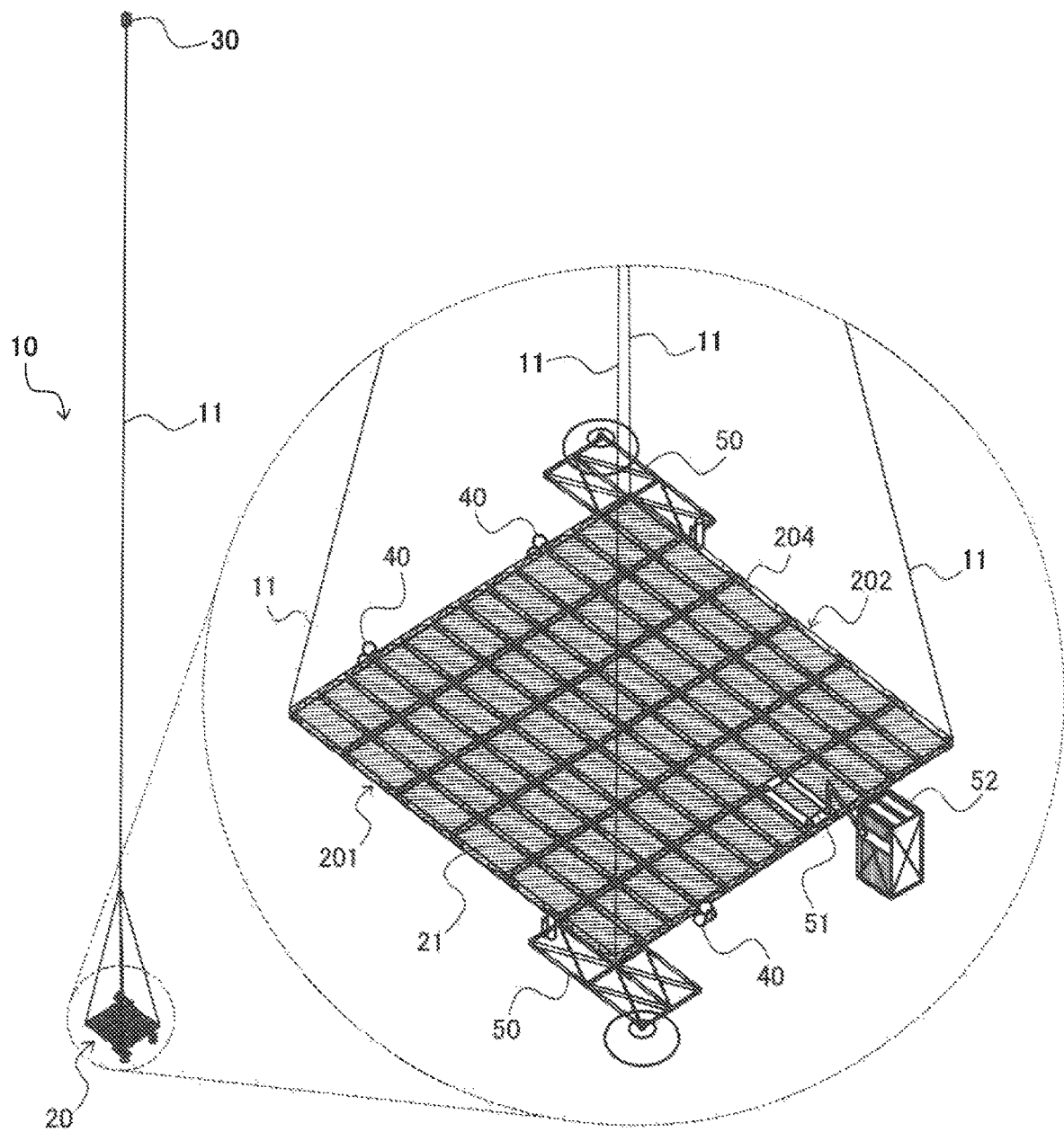
FIG. 1 is a schematic perspective view showing an example of the basic configuration of a radar satellite according to Embodiment 1 of the present invention.
Figure 2A:
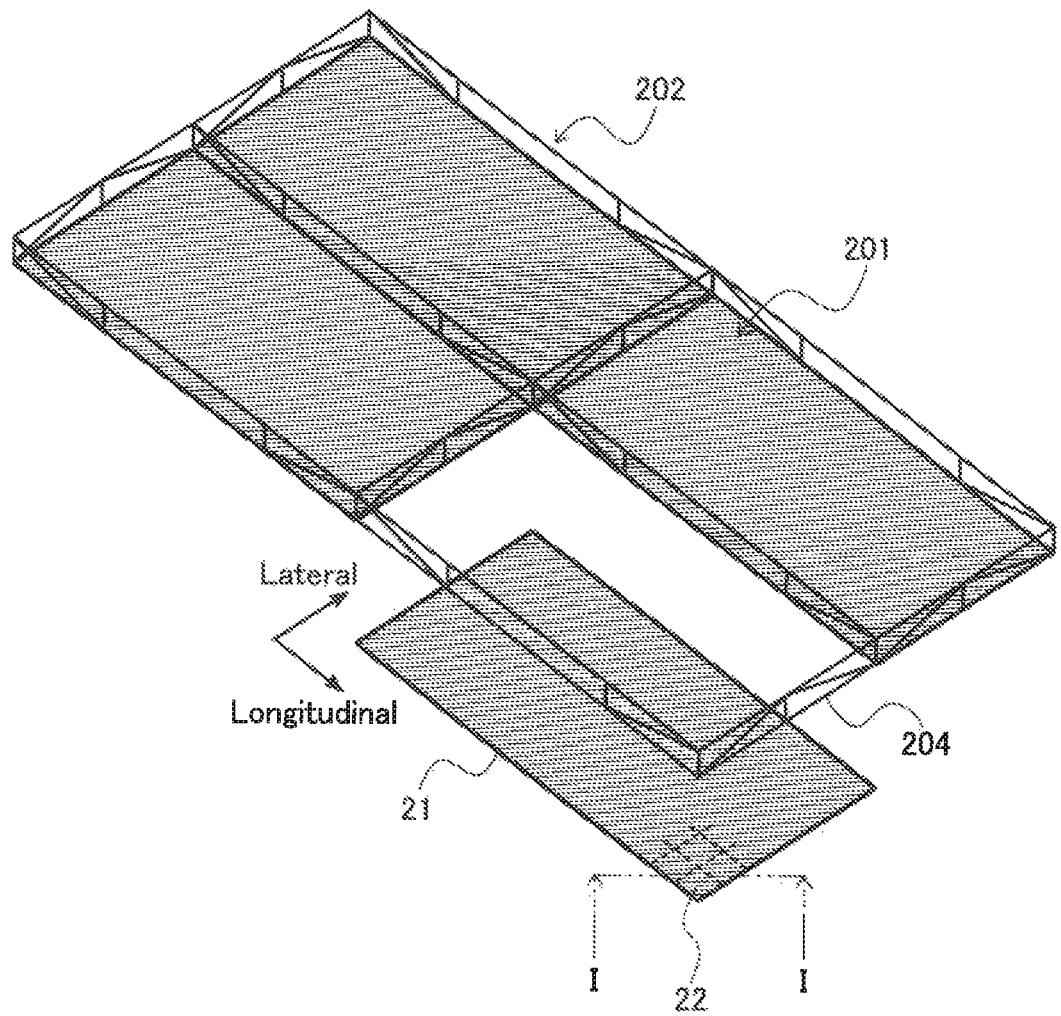
FIG. 2A is a schematic perspective view showing an example of major constituents of a radar unit of the radar satellite of FIG. 1.

As shown in FIG. 1, a radar satellite 10 according to the present embodiment includes a radar unit 20, a bus unit 30, tether wires 11, and the like. The radar unit 20 includes a radar panel array 201 and a deployable truss structure 202. The radar panel array 201 is a single plate-shaped structure including a plurality of radar panels 21 and supported by the deployable truss structure 202. As partially shown in FIG. 2A, the deployable truss structure 202 is a structure including a plurality of side frame members 204 supporting the plurality of radar panels 21, respectively, and coupled to each other in such a manner that the side frame members 204 are foldable and deployable. The deployable truss structure 202 is constituted by, for example, pipe members made of a metal or a composite material (CFRP or the like), hinge members (coupling members) and the like. The radar unit 20 is provided with a plurality of radar thruster units 40, a plurality of communication/control units 50, a service unit 51, a resupply unit 52, and the like. As shown in FIG. 2A, in a case where the lengthwise direction of one radar panel 21 is a longitudinal direction, and a direction perpendicular to the longitudinal direction is a lateral direction, the radar panel array 201 includes 72 radar panels 21 in total (6 radar panels 21 in the longitudinal direction×12 radar panels 21 in the lateral direction), in the example of FIG. 1. As schematically shown in FIG. 2A, each of the radar panels 21 includes a plurality of radar cells 22.

As shown in 2B (partial cross-sectional view taken in the direction of arrows along line I-I of FIG. 2A), each of the plurality of radar cells 22 includes an antenna unit 26, a solar cell 241, a battery 242, and the like. The antenna unit 26 includes a patch antenna 260, a transmission/reception unit 261, and the like. The patch antenna 260 is provided on the reverse surface (lower surface of FIG. 2B) of a panel substrate 211. The solar cell 241 is provided on the obverse surface (upper surface of FIG. 2B) of the panel substrate 211. The battery 242 and the transmission/reception unit 261 are provided between the solar cell 241 and the panel substrate 211. The battery 242, the transmission/reception unit 261, and the patch antenna 260 are electrically connected to each other by a panel wire 212 provided on the reverse surface of the panel substrate 211. The solar cell 241 is also connected to the battery 242 and the like by a wire which is not shown in FIG. 2B.

The patch antenna 260 is an antenna of the radar unit 20 which transmits and receives radar waves. The specific configuration of the patch antenna 260 is not limited, and may be a known configuration using a microstrip line. As the antenna of the radar unit 20, a known antenna other than the patch antenna 260 may be used.

The solar cell 241 supplies electric power to the radar unit 20, the radar thruster unit 40, the communication/control unit 50, and the like. The battery 242 is an electric charging unit charged with the electric power generated by the solar cell 241. Charging and discharging of the battery 242 are controlled by a power supply controller which is not shown in FIG. 2B. Therefore, the solar cell 241, the battery 242, and the power supply controller constitute a radar electric power supply unit 24. The specific configurations of the solar cell 241, the battery 242, and the power supply controller are not limited, and known configurations can be suitably used. The detail of the radar cell 22 including the antenna unit 26 and the radar electric power supply unit 24 will be described later in detail.

Figure 3:
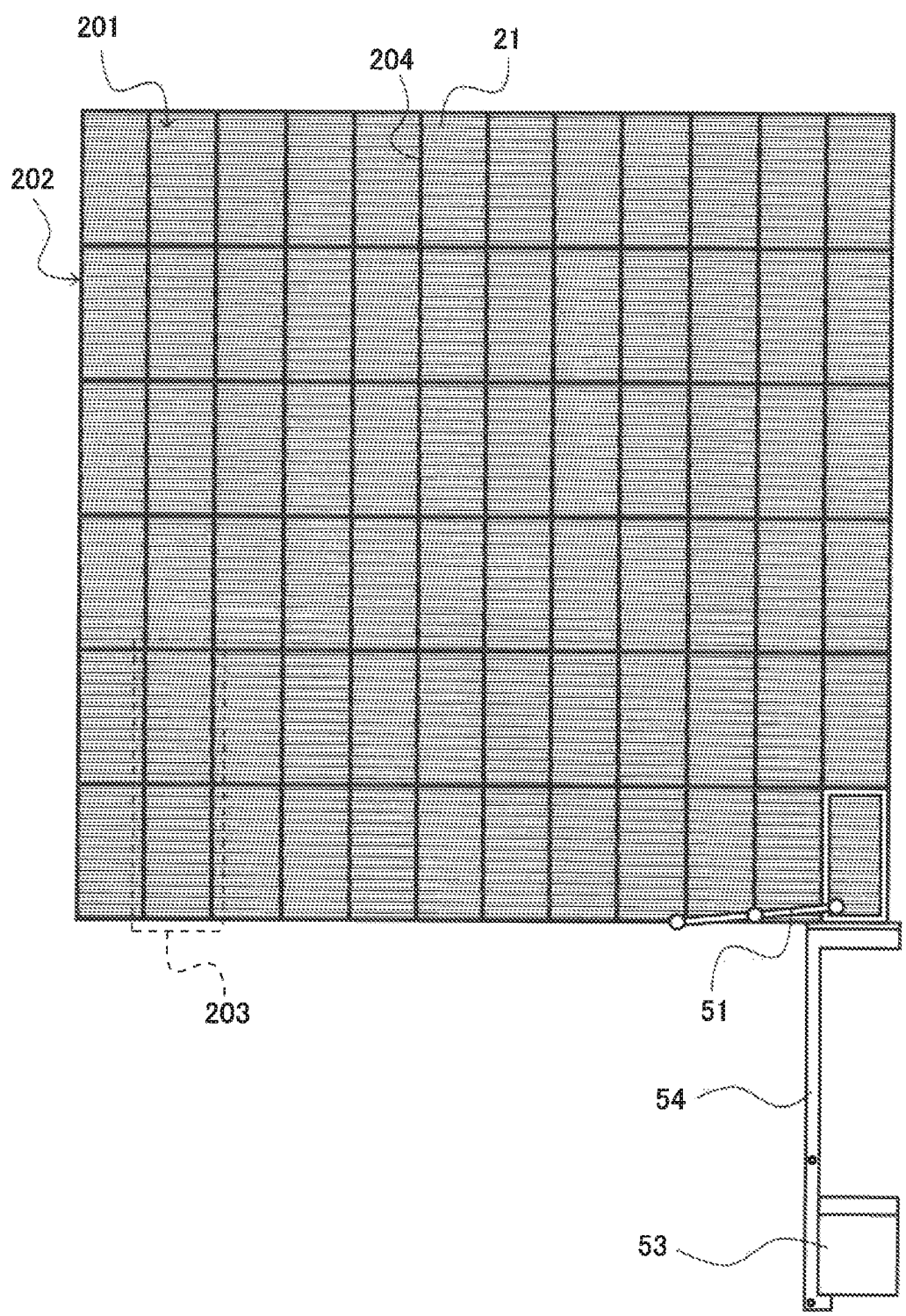
FIG. 3 is a schematic plan view showing an example of the configuration of a radar panel array and a radar panel unit of the radar unit of FIG. 1.

As shown in FIGS. 1 and 3, the radar panel array 201 includes the plurality of (72 in the present embodiment) radar panels 21. As shown in FIG. 3, the plurality of radar panels 21 are coupled to each other to constitute a radar panel unit 203. Each of the radar panels 21 is supported by the side frame member 204. In the example of FIG. 3, the radar panel unit 203 includes two radar panels 21 coupled to each other in the longitudinal direction. The present invention is not limited to this. The radar panel unit 203 may be configured in any way so long as one sides of the plurality of radar panels 21 supported by the side frame members 204, respectively, are coupled to each other at a connection point at which the radar panels 21 are bendable, the radar panels 21 are bendable and foldable at this connection point to become closer to each other, and the radar panels 21 in a folded state are deployable. For example, the radar panel unit 203 may include three or more radar panels 21, or may include the radar panels 21 coupled to each other in the lateral direction instead of the longitudinal direction.

The radar panel unit 203 is stored in a folded state in a panel container 53 of FIG. 3, before the radar panel unit 203 is deployed. Then, the radar panel unit 203 is taken out of the panel container 53, and deployed by a deployment device 54 of FIG. 3. Then, this radar panel unit 203 is coupled to other radar panel units 203 by the service unit 51 of FIGS. 1 and 3. In this way, the plate-shaped structure (the radar panel array 201) including the plurality of radar panels 21 coupled to each other is constructed. At this time, each of the radar panels 21 is supported by the side frame member. Therefore, the radar panel array 201 formed by deploying and coupling the radar panels 21 to each other is supported by the deployable truss structure 202 including the plurality of side frame members 204 coupled to each other. Note that the service unit 51 serves to construct the radar panel array 201, namely the radar unit 20, and maintain the constructed radar unit 20.

At a time point when the radar satellite 10 is launched, the plurality of radar panel units 203 are folded and stored in the panel container 53. After the plurality of radar panel units 203 are carried into the outer space, the plurality of radar panel units 203 are taken out of the panel container 53 and deployed by the deployment device 54. The service unit 51 couples the radar panel units 203 to each other. The number of the radar panel units 203 which can be stored in one panel container 53 is limited. Therefore, if a container set is constructed by coupling the plurality of panel containers 53 together, a great number of radar panel units 203 can be carried into the outer space. This makes it possible to construct a huge conformal array radar (the radar unit 20) in the outer space.

For example, in a case where one radar panel 21 has a size of (7 m×3 m), and the radar panel array 201 includes 72 radar panels 21 as shown in FIG. 1, it becomes possible to construct the radar unit 20 with a size of about (40 m×40 m), to be precise, (42 m×36 m) in the outer space. The radar unit 20 with a size of about (40 m×40 m) has an opening area of about 1,600 $m^2$, and its radar cross-section (RCS) can be significantly increased. This makes it possible to detect as an observation target, for example, a small aircraft flying over the earth surface. Therefore, not only the ground surface or the sea surface (earth surface), but also the airspace above the earth surface can be observed. As a result, more detailed radar images (observation information) can be obtained from the air and sea areas (earth surface, airspace above the earth surface, etc.), and thus radar performance can be significantly improved.

In the radar satellite 10 according to the present invention, the configuration of the radar unit 20 is not limited to the configuration in which the plurality of radar panel units 203 including the side frame members are deployed and coupled to each other. For example, the radar panels 21 may be attached on the plurality of side frame members 204, respectively constituting the deployable truss structure 202 which is deployed. In this case, the radar panels 21 may be attached on the plurality of side frame members 204, respectively by the service unit 51 of FIG. 1 or 3.

In summary, it is sufficient that the radar unit 20 of the present invention includes the radar panel array 201 which is the plate-shaped structure including the plurality of radar panels 21, and the deployable truss structure 202 including the plurality of side frame members 204 supporting the radar panels 21, respectively, and coupled to each other in such a manner that the side frame members 204 are foldable and deployable.

The specific configurations of the service unit 51, the panel container 53, and the deployment device 54 are not limited. In the present invention, as the service unit 51 and the panel container 53, the configurations disclosed in (1) Japanese Laid-Open Patent Application Publication No. 2014-184812, and (2) Japanese Laid-Open Patent Application Publication No. 2014-184813 may be used. As the deployment device 54, the configurations disclosed in (3) Japanese Laid-Open Patent Application Publication No. 2012-131458 in addition to the above-described Patent Application Publications (1) and (2) may be used. The technique for constructing the huge plate-shaped structure by use of the plurality of panels in the outer space are disclosed in the above-described Patent Application Publications (1) to (3), and the entire disclosures of them are incorporated herein by reference.

The bus unit 30 is coupled to the radar unit 20 by the tether wires 11. The tether wires 11 extend from mounting portions of the radar unit 20 to the bus unit 30. In the configuration of FIG. 1, the tether wires 11 extending from the mounting portions of the radar unit 20 are collectively coupled to the bus unit 30. The tether wires 11 extending from the mounting portions of the radar unit 20 may be constituted by a single wire or two or more wires. The specific configuration of the tether wires 11 is not limited. A known wire material such as a stainless wire formed by a plurality of thin wires or a wire with a thin tape shape can be suitably used as the tether wires 11.

The bus unit 30 functions as a counter weight of the radar unit 20. As disclosed in the above-described Patent Application Publications (1) and (2), the panel container 53 can be used as the bus unit 30. The plurality of radar thruster units 40 are disposed around the radar unit 20. The plurality of radar thruster units 40 perform an orbit (course) correction and a posture control for the radar unit 20. In the present invention, as shown in FIG. 1, two radar thruster units 40 are provided at each of two lateral sides of the four sides of the radar unit 20 with a rectangular shape. In the example of FIG. 1, one radar thruster unit 40 which is present on a near side of FIG. 1 is hidden by the resupply unit 52. The specific configurations of the bus unit 30 and the plurality of radar thruster units 40 will be described later.

The communication/control unit 50 can perform communications with each of the radar unit 20, the bus unit 30, the radar thruster unit 40, and the service unit 51 which are included in the radar satellite 10. The communication/control unit 50 can also perform communications with an external spot (location) of the radar satellite 10, such as a spot on the earth or another spacecraft. Further, the communication/control unit 50 controls the operations of the radar unit 20, the bus unit 30, the radar thruster unit 40, and the service unit 51. The specific configuration of the communication/control unit 50 is not limited. For example, known control units and communication devices which can be used in the field of spacecraft may be used as the communication/control unit 50. The operation control and communication performed by the communication/control unit 50 will be described later.

The resupply unit 52 supplies a chemical fuel to the radar thruster unit 40. The radar thruster unit 40 operates by consuming the chemical fuel, to perform an orbit correction or posture control for the radar unit 20. The specific configuration of the resupply unit 52 is not limited, and the configuration known in the field of spacecraft can be suitably used.

[Control Configuration of Radar Satellite]

Next, the control configuration of the radar satellite 10 will be specifically described with reference to FIGS. 4 to 7 in addition to FIGS. 1 to 3.

As described above, as shown in FIGS. 2A and 4, the radar unit 20 includes the plurality of radar panels 21, and each of the plurality of radar panels 21 includes the plurality of radar cells 22. As shown in FIG. 5, each of the plurality of radar cells 22 includes a radar communication unit 23, the radar electric power supply unit 24, a signal processor 25, the plurality of antenna units 26, and the like. The radar communication unit 23 performs communications with the communication/control unit 50 and is connected to the signal processor 25. The plurality of antenna units 26 are connected to the signal processor 25.

Figure 6:
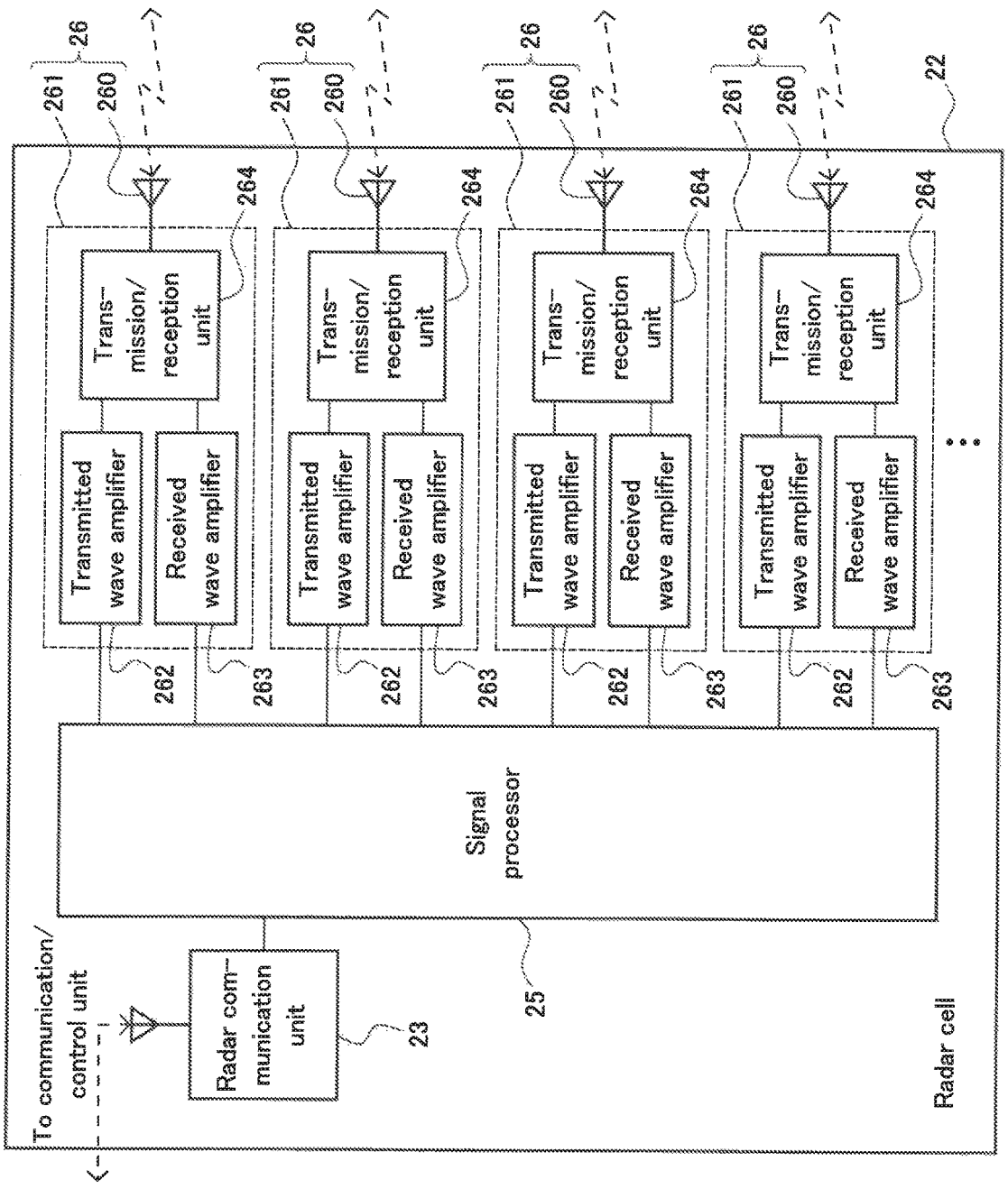
FIG. 6 is a schematic block diagram showing an example of the configuration of a radar cell included in the radar panel of FIG. 5.

As described above, each of the plurality of antenna units 26 includes the patch antenna 260, and the transmission/reception unit 261. As shown in FIG. 6, each of the transmission/reception units 261 includes a transmitted wave amplifier 262, a received wave amplifier 263, a transmission/reception switch 264, and the like. The transmitted wave amplifier 262 and the received wave amplifier 263 are disposed in parallel and connected to the signal processor 25 and the transmission/reception switch 264. The transmission/reception switch 264 is connected to the patch antenna 260 in addition to the transmitted wave amplifier 262 and the received wave amplifier 263.

The patch antenna 260 transmits the radar waves (transmitted waves) toward the earth surface, and receives the radar waves (received waves) reflected on the earth surface. The signal processor 25 generates the transmitted waves in response to a transmitted wave generation command input by the communication/control unit 50 via the radar communication unit 23. In addition, the signal processor 25 converts the received waves into image generation information and sends the image generation information to the radar communication unit 23. The image generation information is output to the communication/control unit 50 via the radar communication unit 23 and transmitted to a spot on the earth or another spacecraft. The transmitted wave amplifier 262 amplifies the transmitted waves generated by the signal processor 25 and sends the amplified transmitted waves to the patch antenna 260 via the transmission/reception switch 264. The received wave amplifier 263 amplifies the waves received by the patch antenna 260, and sends the amplified received waves to the signal processor 25. The transmission/reception switch 264 performs switching between transmission and reception of the radar waves.

The specific configurations of the signal processor 25 and the transmission/reception unit 261 (the transmitted wave amplifier 262, the received wave amplifier 263, the transmission/reception switch 264, etc.) are not limited, and the configurations known in the field of the radar apparatus can be suitably used. The specific configuration of the radar communication unit 23 is not limited so long as the radar communication unit 23 can perform communications with the communication/control unit 50 in the outer space, and communication devices known in the field of spacecraft can be suitably used. Further, electromagnetic waves used in the communication are not limited, and known electric waves or optical communication laser light may be used.

The above-described configuration of the radar unit 20 is similar to that of a general radar apparatus. The specific configuration of the radar unit 20 is not limited, and other known configurations of the radar apparatus can be suitably used.

Figure 2B:
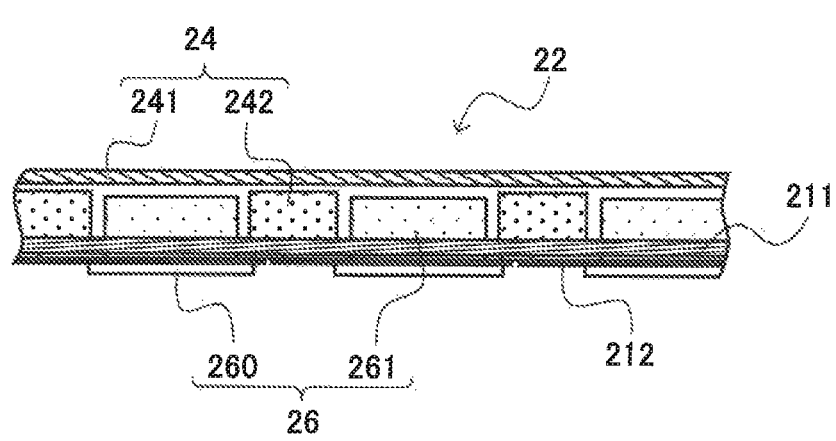
FIG. 2B is a partial cross-sectional view taken in the direction of arrows along line I-I of FIG. 2A.

As shown in FIG. 5, the radar cell 22 includes the radar electric power supply unit 24 (see FIG. 2B). As described above, the radar electric power supply unit 24 includes the solar cell 241, the battery 242, and the power supply controller 243. The radar electric power supply unit 24 supplies the electric power to the radar communication unit 23, the signal processor 25, the antenna unit 26 and the like (see a block arrow of FIG. 5). The radar electric power supply unit 24 also supplies the electric power to the radar thruster unit 40 and the communication/control unit 50, which will be described later.

Figure 4:
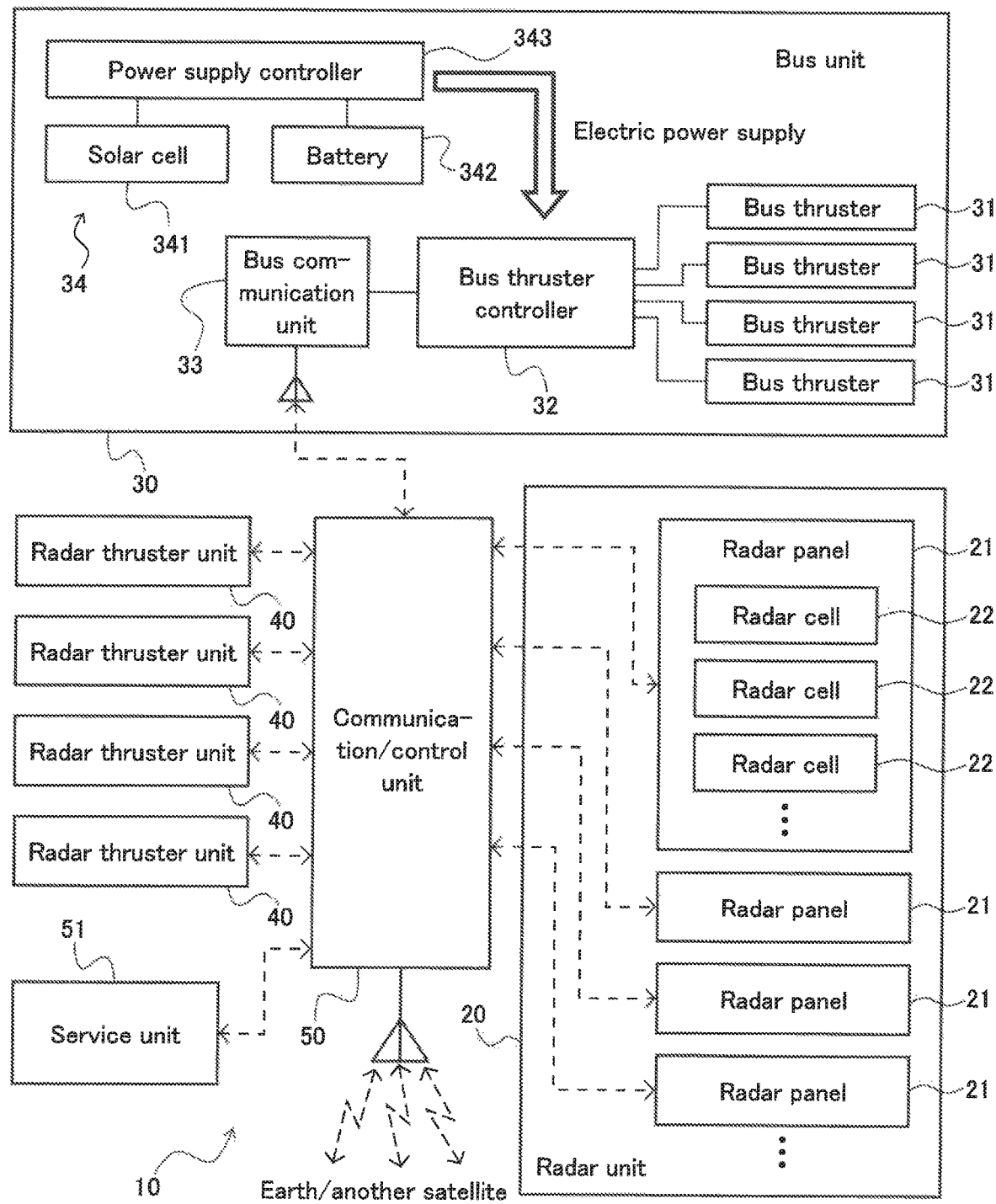
FIG. 4 is a schematic block diagram showing an example of a control configuration of the radar satellite of FIG. 1.
Figure 5:
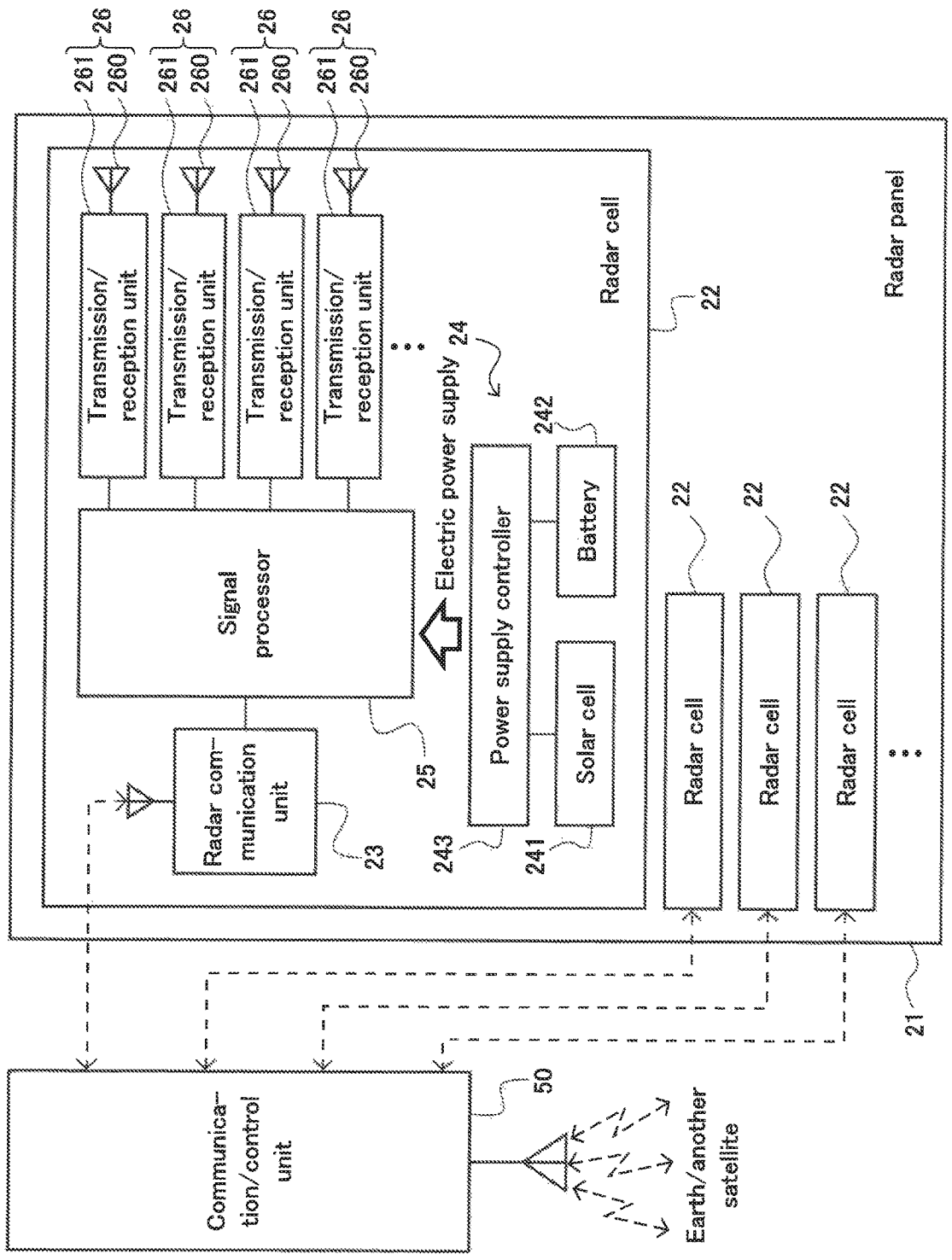
FIG. 5 is a schematic block diagram showing an example of the configuration of a radar panel of the radar satellite of FIG. 4.

As shown in FIG. 4, the bus unit 30 includes a plurality of bus thrusters 31, a bus thruster controller 32, a bus communication unit 33, a bus electric power supply unit 34, and the like. Each of the bus thrusters 31 performs an orbit correction or a posture control for the bus unit 30. A bus thruster known as a thruster of spacecraft can be suitably used as the bus thruster 31.

The bus thruster controller 32 controls the operations of the bus thrusters 31. The bus communication unit 33 is connected to the bus thruster controller 32 and can perform communications with the communication/control unit 50. The specific configurations of the bus thruster controller 32 and the bus communication unit 33 are not limited, and control units, communication devices and the like which are known in the field of spacecraft can be suitably used. When an operation control command from the communication/control unit 50 is input to the bus thruster controller 32 via the bus communication unit 33, the bus thrusters 31 operate in response to this operation control command.

The bus electric power supply unit 34 supplies the electric power to the bus thruster controller 32, the bus communication unit 33, and the like (see brock arrow of FIG. 4). The bus electric power supply unit 34 includes a solar cell 341, a battery 342, a power supply controller 343, and the like. The basic configuration of the bus electric power supply unit 34 is similar to that of the radar electric power supply unit 24 included in the radar cell 22, and will not be specifically described.

Figure 7:
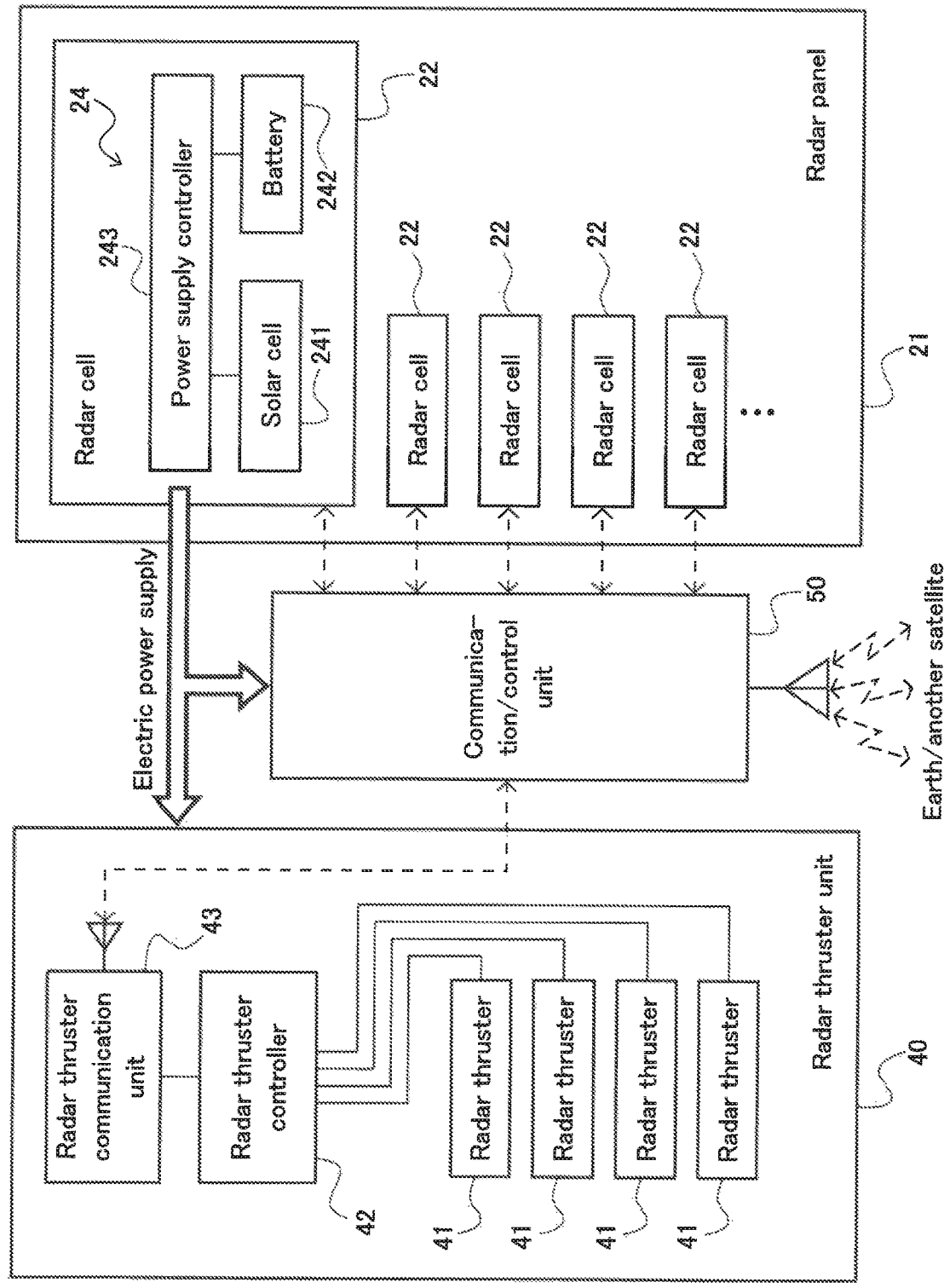
FIG. 7 is a schematic block diagram showing an example of the configuration of a radar thruster unit of the radar satellite of FIG. 4.

As shown in FIG. 7, the radar thruster unit 40 includes a plurality of radar thrusters 41, a radar thruster controller 42, a radar thruster communication unit 43, and the like. The radar thruster controller 42 controls the operations of the radar thrusters 41 to perform an orbit correction or a posture control for the radar unit 20. The specific configuration of the radar thrusters 41 is not limited. As in the bus thrusters 31, a radar thruster known as a spacecraft thruster can be suitably used as the radar thrusters 41.

The radar thruster controller 42 controls the operations of the radar thrusters 41. The radar thruster communication unit 43 is connected to the radar thruster controller 42 and can perform communications with the communication/control unit 50. The specific configurations of the radar thruster controller 42 and the radar thruster communication unit 43 are not limited, and for example, a control unit and a communication device which are known in the field of spacecraft can be suitably used. When an operation control command from the communication/control unit 50 is input to the radar thruster controller 42 via the radar thruster communication unit 43, the radar thrusters 41 operate in response to this operation control command.

As described above, each of the radar panels 21 included in the radar unit 20 includes the radar electric power supply unit 24. As shown in block arrows of FIG. 7, the radar electric power supply unit 24 supplies the electric power to the radar thruster unit 40 and the communication/control unit 50 in addition to the radar unit 20. A power supply path is not limited so long as the solar cell 241 or the battery 242 as the electric charging unit in the radar electric power supply unit 24 is electrically connected to the radar thruster unit 40 or the communication/control unit 50 by a known method.

As shown in FIG. 4, each of the communication/control units 50 can perform communications with the radar unit 20, the bus unit 30, the radar thruster units 40, the service unit 51, and the like, and controls the operations of the radar unit 20, the bus unit 30, the radar thruster units 40, the service unit 51, and the like. As described above, the communication/control unit 50 can perform communications with a spot on the earth and another spacecraft. Under the control of the spot on the earth, the communication/control unit 50 can control the operations of the radar unit 20, the bus unit 30, the radar thruster units 40, the service unit 51, and the like. In addition, according to, for example, computer programs and the like pre-stored in a memory unit (not shown), the communication/control unit 50 can control the operations of the radar unit 20, the bus unit 30, the radar thruster units 40, the service unit 51, and the like.

The radar satellite 10 according to the present invention may include constituents other than the radar unit 20, the bus unit 30, the radar thruster units 40, the service unit 51, and the like. Each of the communication/control units 50 can control the operations of the constituents other than the radar unit 20, the bus unit 30, the radar thruster units 40, the service unit 51, and the like. For example, in the example of FIG. 1, the radar satellite 10 includes the resupply unit 52, and the communication/control unit 50 may control the operation of the resupply unit 52. Further, the communication/control unit 50 may control the operations of another spacecraft capable of communication.

[Observation by Radar Satellite]

Now, observation of the earth surface and the airspace above the earth surface (obtaining the information from the air and sea areas) which is performed by the radar satellite 10 having the above-described configuration will be described with reference to FIG. 8. As indicated by dot-and-dash line in FIG. 8, the radar satellite 10 revolves along an orbit Os at, for example, an altitude of 5,000 km. As indicated by a broken-line bidirectional arrow C1 in FIG. 8, the radar satellite 10 can perform communications with a spot on the earth via the communication/control unit 50.

The communication/control unit 50 outputs the operation command directing transmission of the radar waves to the radar unit 20 according to the pre-stored computer programs or the command received from the spot on the earth. The radar unit 20 is the conformal array radar including a great number of radar panels 21. Therefore, in the radar unit 20, a great number of patch antennas 260 provided on the reverse surfaces of the radar panels 21 are digital-controlled, and thus the phases of the transmitted radar waves (transmitted waves) are controlled, in accordance with the operation command provided by the communication/control unit 50.

Figure 8:
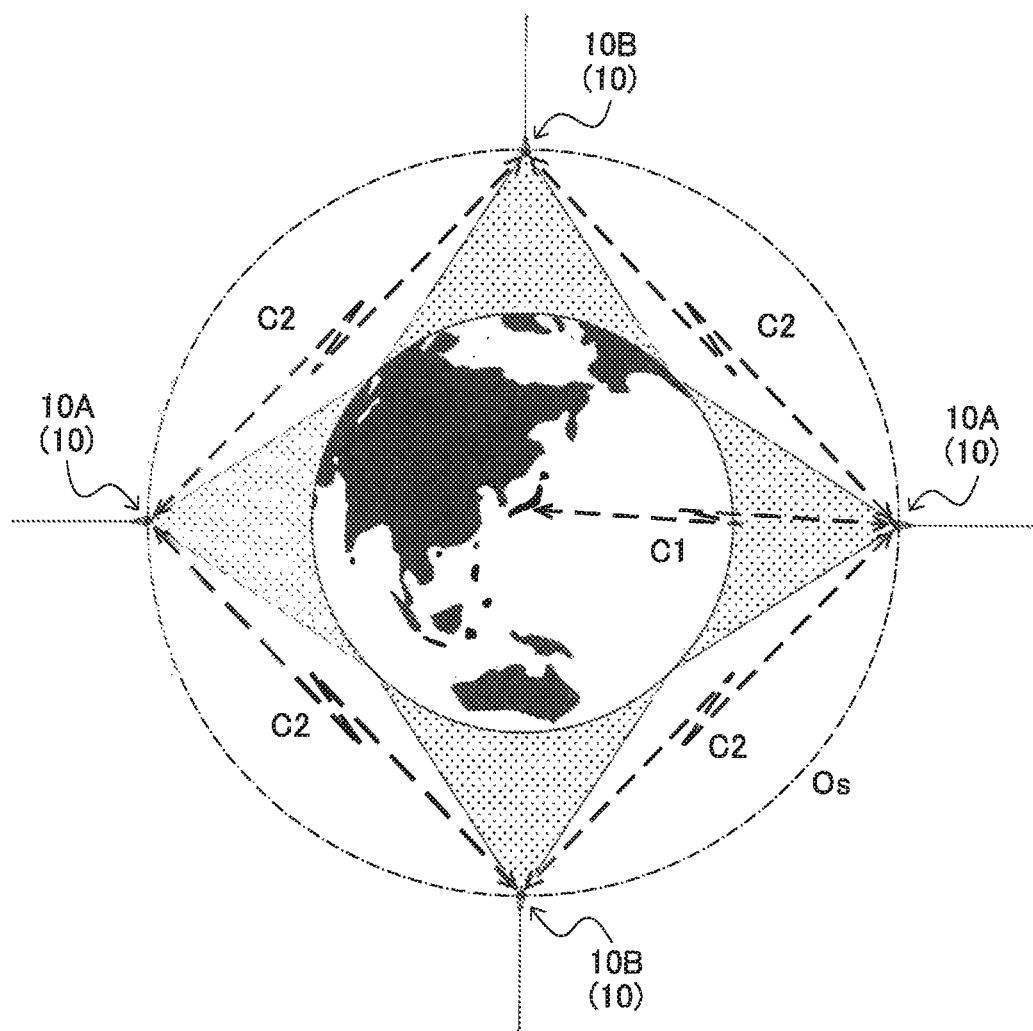
FIG. 8 is a schematic view showing an example of observation of an earth surface which is performed by the radar satellite of FIGS. 1 and 4.

The transmitted waves from a great number of patch antennas 260 are synthesized, and a synthesized transmitted wave corresponding to the size of the radar unit 20 is emitted as indicated by a hatched region of FIG. 8. By this synthesized transmitted wave, the earth surface (and the airspace above the earth surface) are scanned. Received waves reflected on the earth surface and the airspace above the earth surface are received by a great number of patch antennas 260. The signal processor 25 converts the received waves into data for image, and outputs the data for image to the communication/control unit 50. The communication/ control unit 50 transmits the data for image to the spot on the earth. In the spot on the earth surface, the image information (radar image) of the earth surface and the airspace above the earth surface is generated based on the received data for image, and displayed on a display device and the like.

Driving electric power for the radar unit 20 and the communication/control units 50 is covered by the solar cells 241 included in the radar unit 20. Since the radar unit 20 includes the batteries 242 as the electric charging units, the radar unit 20 and the communication/control units 50 can be activated by the electric power from the batteries 242 even in a case where the radar satellite 10 passes into the earth's shadow. For example, in the case of the radar unit 20 with a size of about (40 m×40 m), all of the solar cells 241 can generate the electric power of about 400 kW. Therefore, the radar unit 20 can sufficiently secure the electric power required for the radar satellite 10.

Since the communication/control unit 50 controls the operation of the radar thruster unit 40, the orbit correction or posture control for the radar unit 20 can be performed in response to the command transmitted from the spot on the earth. Likewise, the orbit correction or posture control for the bus unit 30 can be performed by the communication/control units 50. As shown in FIG. 4, the electric power for the bus unit 30 is covered by the bus electric power supply unit 34.

In particular, in the radar satellite 10 of the present invention, the radar panel array 201 included in the radar unit 20 includes a great number of radar panels 21, each of radar panels 21 includes a great number of radar cells 22, and each of the radar cells 22 includes several tens of thousands to several millions of patch antennas 260. For example, the radar unit 20 with a size of about (40 m×40 m) of FIG. 1 can include about 260,000 patch antennas 260. In this configuration, even if a failure occurs in several to several tens of patch antennas 260, the performance of the radar unit 20 is not virtually affected. As a result, the radar satellite 10 can provide a high level of redundancy.

In the radar satellite 10 according to the present invention, each of a great number of radar panels 21 included in the radar panel array 201 (the radar unit 20) can be replaced (changed) by the service unit 51. For example, in a case where a failure occurs in a plurality of patch antennas 260 in an arbitrary radar panel 21, a replacement radar panel 21 for the arbitrary radar panel 21 with a failure is transmitted from a spot on the earth, the service unit 51 is operated by the communication/control unit 50 under control of the spot on the earth to replace the arbitrary radar panel 21 with the replacement radar panel 21. In this way, maintaining the radar unit 20 by the service unit 51 includes replacement of the radar panel 21.

As described above, a great number of radar panel units 203 are carried into the outer space and coupled together, the radar unit 20 with a huge size can be constructed. Therefore, one radar satellite 10 can observe very wide ranges of the earth surface and the airspace above the earth surface. Further, in a case where a radar satellite 10A revolving along an equatorial orbit and a radar satellite 10B revolving along a polar orbit can perform mutual communications with each other as indicated by broken-line bidirectional arrows C2 of FIG. 8, the whole of the earth surface and whole of the airspace above the earth surface (whole of the air and sea areas including the whole of the ground surface and the whole of the sea surface, and the airspace above the whole of the ground surface and the whole of the sea surface) can be observed. For example, in a case where the radar satellite 10 is revolved along a medium orbit at about an altitude of 5,000 km or 10,000 km, the radar unit 20 can scan the earth surface and the airspace above the earth surface while the radar satellite 10 is passing through the sky in 2 to 3 hours. In this way, the earth surface and the airspace above the earth surface can be observed from different angles, and a high observation capability (radar performance) can be realized.

Further, as described above, the radar satellite 10 according to the present invention may include constituents other than the radar unit 20, the bus unit 30, the radar thruster units 40, and the service unit 51. For example, the radar satellite 10 may include constituents other than the constituents for realizing the function of the radar satellite 10, such as a sensor or an observation system using visible light, infrared light, or the like, other information collecting apparatuses, other communication units, and the like. In this way, the radar satellite 10 of the present invention can be used as "space huge platform" having a variety of observation functions, as well as the "radar satellite."

As described above, the radar satellite 10 according to the present invention includes the radar unit 20 including the plurality of radar panels 21 coupled to each other in the single flat plate shape, each of the plurality of radar panels 21 including the plurality of antennas (e.g., patch antennas 260) for transmitting and receiving the radar waves, and the solar cells 241, and the communication unit which performs communications with the spot on the earth or the spacecraft, and the radar unit 20 includes the plurality of radar panel units 203 deployed and coupled to each other, in which one sides of the plurality of radar panels 21 of each of the radar panel units 203 are coupled to each other at the connection point at which the radar panels 21 are bendable, are bent and folded at this connection point to become closer to each other. Although in the present embodiment, the communication unit is integrated with the control unit as the communication/control unit 50, the communication unit and the control unit may be separated from each other.

In accordance with this configuration, the radar unit 20 with a flat plate shape and a huge size can be constructed by coupling the deployed radar panel units 203 to each other. Therefore, at a time point when the radar satellite 10 is launched, the plurality of radar panel units 203 are folded. Then, in the outer space, the plurality of radar panel units 203 are deployed and coupled to each other. In this way, a huge conformal array radar can be constructed in the outer space.

In the above-described manner, it becomes possible to provide the radar satellite 10 which can obtain the observation information about the earth surface and the airspace above the earth surface, from the outer space, without use of the synthetic aperture radar (SAR). In particular, since the radar unit 20 can observe an object moving on the earth surface (ground surface and sea surface) and flying in the airspace above the earth surface, more detailed information about the earth surface and the airspace above the earth surface (air and sea areas) can be obtained from the outer space. By processing the information obtained by the radar unit 20 by many information processing methods, a variety of observation information can be obtained. Moreover, if the radar satellite 10 includes an observation apparatus other than the radar unit 20, observation information other than the radar image can be obtained.

By adjusting the number of the radar panel units 203 to be coupled together, the size of the radar unit 20 can also be adjusted. Since the radar unit 20 of the radar satellite 10 includes the plurality of radar panels 21, and each of the radar panels 21 includes the plurality of antennas, effects on the radar performance can be suppressed or avoided even if a failure occurs in a part of the antennas. Since the radar unit 30 includes a great number of radar panels 21, the radar panel 21 with a failure can be replaced with the replacement radar panel 21. Therefore, the radar satellite 10 can provide a high level of redundancy.

Embodiment 2

Next, a typical example of a radar satellite system according to the present invention, including the above-described radar satellite 10 will be specifically described with reference to FIGS. 9 and 10.

Figure 9:
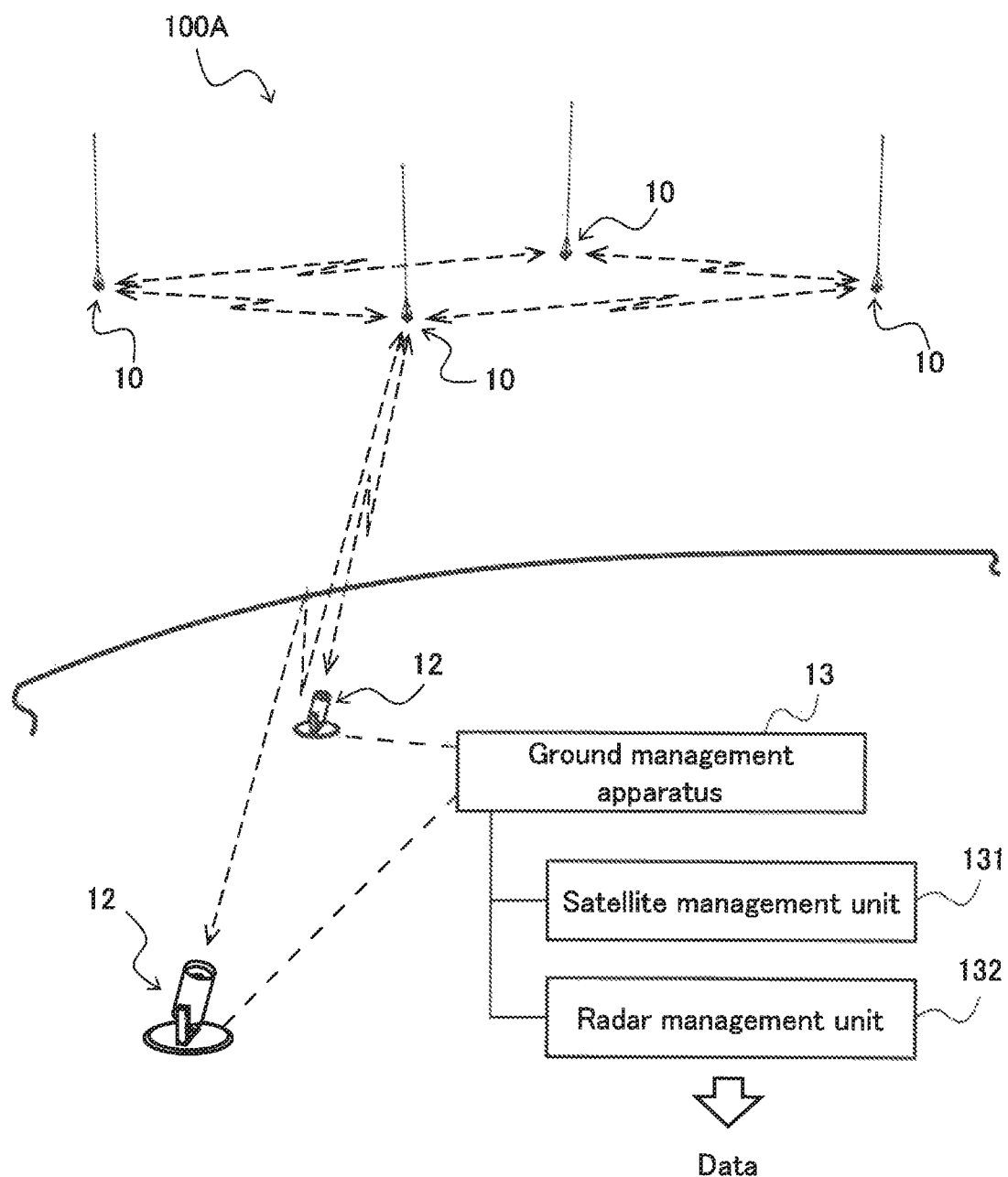
FIG. 9 is a schematic view showing an example of the configuration of a radar satellite system according to Embodiment 2 of the present invention.
Figure 10:
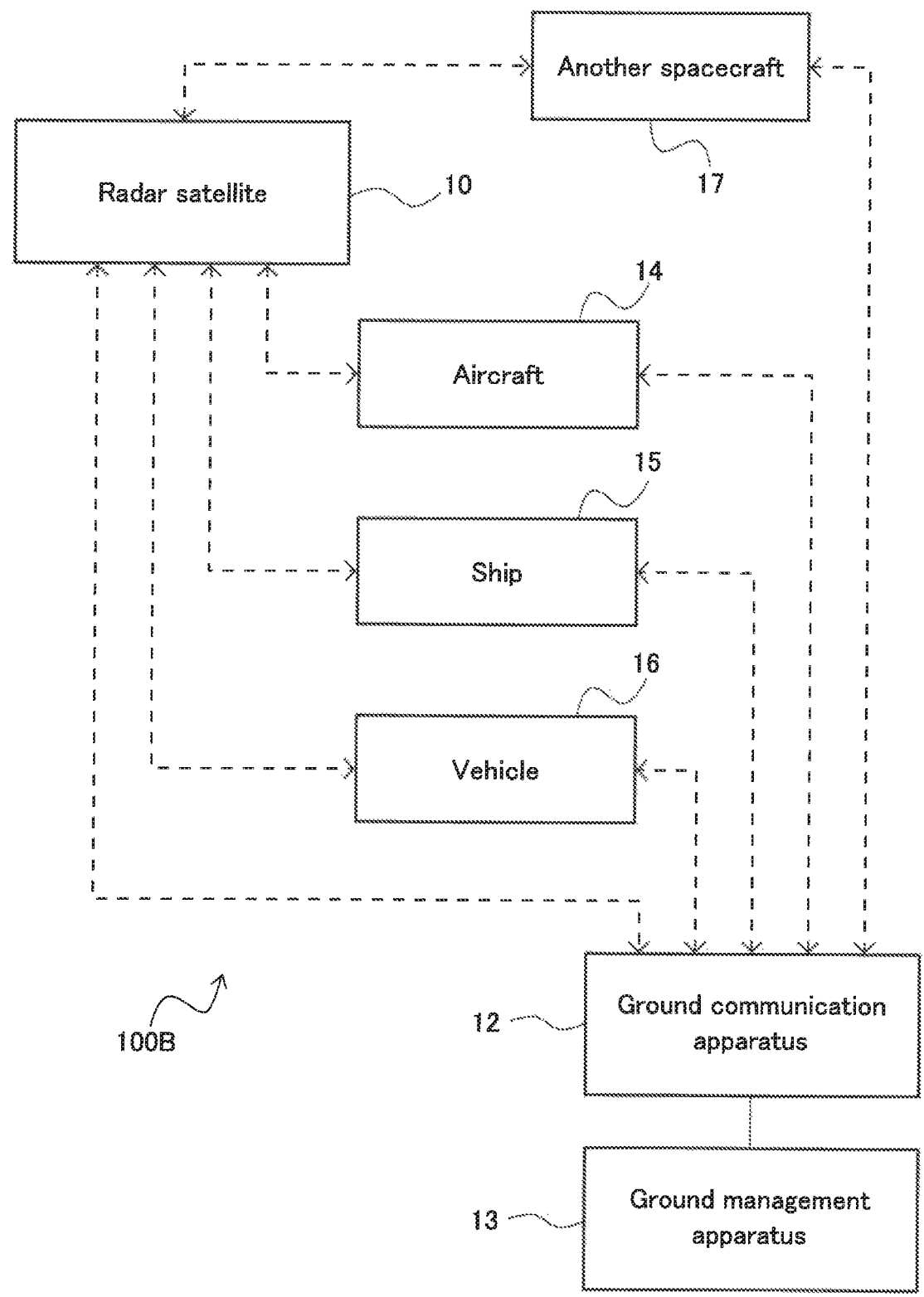
FIG. 10 is a schematic block diagram showing another example of the configuration of a radar satellite system according to Embodiment 2 of the present invention.

As shown in FIG. 9, a radar satellite system 100A according to the present embodiment includes the radar satellites 10, ground communication apparatuses 12, and a ground management apparatus 13. In the example of FIG. 9, the radar satellite system 100A includes four radar satellites 10. However, the number of the radar satellites 10 is not limited to this. The number of the radar satellites 10 may be less than four (one, two, or three), or five or more.

Each of the ground communication apparatuses 12 is a known communication apparatus which performs communications with the radar satellite 10. In the example of FIG. 9, the radar satellite system 100A includes two ground communication apparatuses 12 which are schematically shown. However, in actual cases, the radar satellite system 100A includes a great number of ground communication apparatuses 12. The ground management apparatus 13 includes a satellite management unit 131, and a radar management unit 132. The ground management apparatus 13 performs communications with the radar satellite 10 via the ground communication apparatus 12, and manages the radar satellite 10. The radar satellite 10 has a function of "satellite" which is a spacecraft, and a function of "radar apparatus" located in the outer space. Therefore, the satellite management unit 131 manages and controls the function of the radar satellite 10 as the "satellite". The radar management unit 132 manages and controls the function of the radar satellite 10 as the "radar apparatus."

The specific configuration and management and control methods of the ground management apparatus 13 are not limited, and a configuration and management and control methods which are known in the field of the spacecraft or the ground radar apparatus may be used.

The radar satellite system according to the present invention may further include other constituents. For example, as shown in the schematic block diagram of FIG. 10, another radar satellite system 100B according to the present embodiment includes an aircraft 14, a ship (marine vessel) 15, a vehicle 16, and another spacecraft 17 other than the radar satellite 10, in addition to the radar satellites 10, the ground communication apparatuses 12, and the ground management apparatus 13. For example, the aircraft 14, the ship 15 and the vehicle 16 can perform communications with one of or both of the radar satellite 10 and the ground management apparatus 13 (the ground communication apparatus 12). In this way, a variety of information obtained by the observation of the air and sea areas can be used to manage and control the aircraft 14, the ship 15, and the vehicle 16.

Examples of another spacecraft 17 are a space station, another satellite, and the like. If the spacecraft 17 is configured to perform communications with one of or both of the radar satellite 10 and the ground management apparatus 13, it becomes possible to make use of the information obtained by the radar satellite 10 for the purpose of space exploitation.

It is known that communications using the radar waves (radar communications) can be performed by adding modulation signals for communications to the radar waves. Therefore, by using the radar waves transmitted from the radar satellite 10, the communications with the aircraft 14, the ship 15, the vehicle 16 and another spacecraft 17 can be performed. In a case where the communications using the radar satellite 10 can be performed, the radar satellite system 100B can be applied to general communications and utilized in emergency communications in the case of emergencies such as disasters.

As described above, by using the radar satellite 10A revolving along the equatorial orbit and the radar satellite 10B revolving along the polar orbit as shown in FIG. 8, the whole of the surface of the earth (globe) can be observed. Therefore, the radar satellite system 100B according to the present invention is effectively used to manage and control the aircraft 14 or the ship 15 moving over wide ranges on the earth.

Further, the radar satellite 10 according to the present invention is effectively used in the field of observation of the air and sea areas for the purpose of weather observation, disaster response, ecological monitoring, geomorphometry, and so on. If the aircraft 14 or the vehicle 16 can be managed and controlled by use of, for example, the radar satellite system 100B in the outer space, the radar satellite 10 can be utilized in disaster monitoring, reconstruction assistance of disasters, or defense. For example, in a case where a disaster occurs in an area, the radar satellite 10 observes this area, and the ground management apparatus 13 can manage and control the aircraft 14 or the vehicle 16 in this area by use of the information obtained by the radar satellite 10.

It should be noted that the present invention is not limited to the embodiments described above, and various modifications can be made within the scope of Claims. Embodiments obtained by suitably combining technical means that are disclosed in different embodiments and variations also fall within the technical scope of the present invention.

INDUSTRIAL APPLICABILITY

The present invention is suitably used in the field of observation of an earth surface and an airspace above the earth surface, by a radar located in an outer space.

REFERENCE SIGNS LIST 10, 10A, 10B radar satellite
11 tether wire
12 ground communication apparatus
13 ground management apparatus
14 aircraft
15 ship
16 vehicle
20 radar unit
21 radar panel
22 radar cell
23 radar communication unit
24 radar electric power supply unit
25 signal processor
26 antenna unit
30 bus unit
31 bus thruster
32 bus thruster controller
33 bus communication unit
34 bus electric power supply unit
40 radar thruster unit 41 radar thruster
42 radar thruster controller
43 radar thruster communication unit
50 communication/control unit (communication unit)
51 service unit
100A, 100B radar satellite system
201 radar panel array
202 deployable truss structure
203 radar panel unit
204 side frame member
241, 341 solar cell
242, 342 battery
243, 343 power supply controller
260 patch antenna (antenna)
261 transmission/reception unit

The invention claimed is:

1. A radar satellite comprising:
a radar unit including a plurality of radar panels coupled to each other in a single flat plate shape, each of the plurality of radar panels including:
   a plurality of antennas which transmit and receive radar waves, and
   a solar cell; and
a communication unit which performs communications with a spot on an earth or a spacecraft, wherein:
when the plurality of antennas transmit radar waves, the transmitted radar waves are phase-controlled and synthesized according to a predetermined computer program or a command received from the spot on the earth;
a synthesized transmitted wave corresponding to a size of the radar unit is emitted from the radar satellite to scan an earth surface and an airspace above the earth surface, with the proviso that
   the synthesized transmitted wave emitted from the radar satellite is configured to scan a wide range of the earth surface such that, when one radar satellite revolves along an equatorial orbit and another radar satellite revolves along a polar orbit, the whole earth surface is scanned;
received radar waves reflected from the earth surface and the airspace are converted by a signal processor into data for image without being synthesized, and the data for image is output to the communication unit; and
the radar unit includes:
   a radar panel array which is a plate-shaped structure including the plurality of radar panels; and
   a deployable truss structure including a plurality of side frame members supporting the plurality of radar panels, respectively, and coupled to each other in such a manner that the plurality of side frame members are foldable and deployable.

2. The radar satellite according to claim 1, wherein the radar unit:
includes a plurality of radar panel units deployed and coupled to each other, each of the plurality of radar panel units including the plurality of radar panels and having a configuration in which one sides of the plurality of radar panels respectively supported by the side frame members are coupled to each other at a connection point at which the plurality of radar panels are bendable, and the plurality of radar panels are bendable and foldable at the connection point to become closer to each other; or
has a configuration in which the plurality of radar panels are respectively attached on the plurality of side frame members included in the deployable truss structure which is deployed.

3. The radar satellite according to claim 1, comprising:
a thruster unit which performs an orbit correction and a posture control for the radar unit; and
a radar control unit which controls an operation of the thruster unit and an operation of the radar unit.

4. The radar satellite according to claim 1, comprising:
a bus unit which is a counter weight of the radar unit; and
a tether wire coupling the radar unit to the bus unit.

5. The radar satellite according to claim 1, wherein each of the plurality of radar panels includes:
an electric charging unit charged with electric power generated by the solar cell, and
a power supply controller which controls at least charging and discharging of the electric charging unit.

6. The radar satellite according to claim 1, comprising:
a service unit which constructs the radar unit by coupling to each other a plurality of radar panel units which are deployed, and maintains the constructed radar unit.

7. The radar satellite according to claim 6, wherein
in a case where a failure occurs in one of the plurality of radar panels, the service unit is operated by the communication unit under control of the spot on the earth to replace the failed radar panel with a replacement radar panel.

8. A radar satellite system comprising:
the radar satellite as recited in claim 1;
a ground communication apparatus which performs communications with the radar satellite; and
a ground management apparatus which manages the radar satellite via the ground communication apparatus.

9. The radar satellite system according to claim 8, comprising:
at least one of an aircraft, a ship, and a vehicle which are capable of performing communications with the radar satellite or the ground management apparatus.

10. The radar satellite according to claim 1, wherein the plurality of radar panels are redundantly configured so as to allow replacement of one of the plurality of radar panels with a new radar panel sent from an external location.

11. The radar satellite according to claim 3, wherein the thruster unit is disposed on the radar unit such that the radar unit moves by the thruster unit disposed on itself without being connected to any spacecraft.

12. A method performed by a radar satellite comprising a radar unit including a plurality of radar panels coupled to each other in a single flat plate shape, each of the plurality of radar panels including a plurality of antennas which transmit and receive radar waves, and a solar cell, the method comprising:
when the plurality of antennas transmit radar waves, phase-controlling and synthesizing the transmitted radar waves according to a predetermined computer program or a command received from a spot on the earth;
emitting from the radar satellite a synthesized transmitted wave corresponding to a size of the radar unit to scan an earth surface and an airspace above the earth surface, with the proviso that
   the synthesized transmitted wave emitted from the radar satellite is configured to scan a wide range of the earth surface such that, when one radar satellite revolves along an equatorial orbit and another radar satellite revolves along a polar orbit, the whole earth surface is scanned; and
converting, by a signal processor, received radar waves reflected from the earth surface and the airspace into data for image without synthesizing the received radar waves, and outputting the data for image to a communication unit, wherein the radar unit includes:
- a radar panel array which is a plate-shaped structure including the plurality of radar panels; and
- a deployable truss structure including a plurality of side frame members supporting the plurality of radar panels, respectively, and coupled to each other in such a manner that the plurality of side frame members are foldable and deployable.

\* \* \* \* \*